United States Patent
Nilsson et al.

(10) Patent No.: US 6,442,841 B1
(45) Date of Patent: Sep. 3, 2002

(54) DEVICE IN CONNECTION WITH HAND-OPERATED WORKING MACHINE

(75) Inventors: Dan Nilsson, Sjuntorp; Ove Donnderdal, Sävedalen; Håkan Larsson, Mölndal, all of (SE)

(73) Assignee: Aktiebolaget Electrolux (publ.), Stockholm (SE)

( * ) Notice: Subject to any disclaimer, the term of this patent is extended or adjusted under 35 U.S.C. 154(b) by 0 days.

(21) Appl. No.: 09/102,748

(22) Filed: Jun. 23, 1998

(30) Foreign Application Priority Data

Jun. 25, 1997 (SE) .............................. 9702439

(51) Int. Cl.⁷ ............................ B23D 59/02; B27B 5/14
(52) U.S. Cl. ........................ 30/123.3; 30/276; 30/389; 125/13.02; 173/170
(58) Field of Search ......................... 30/123.3, 123.4, 30/276, 389, 264, 272.1, 277.4, 388, 515; 173/170, 169; 125/13.01; 137/637.1; 251/99, 103, 104, 107, 109

(56) References Cited

U.S. PATENT DOCUMENTS

| 1,717,547 A | * | 6/1929 | Bens ..................... 30/123.4 X |
| 2,898,893 A | * | 8/1959 | Rohrer et al. ............ 173/170 X |
| 2,929,134 A | * | 3/1960 | Mosher ................... 173/170 X |
| 3,666,027 A | * | 5/1972 | Sauerwein et al. ..... 173/170 X |
| 4,352,241 A | * | 10/1982 | Johansson ................... 30/123.4 |
| 4,646,607 A | * | 3/1987 | Johansson ................. 30/389 X |
| 5,038,474 A |   | 8/1991 | Larsson et al. ............. 30/123.3 |
| 5,184,403 A | * | 2/1993 | Schliemann ............... 30/123.4 |
| 5,332,156 A | * | 7/1994 | Wheeler ................. 173/170 X |
| 5,687,802 A | * | 11/1997 | Spooner et al. ......... 173/170 X |
| 5,924,497 A | * | 7/1999 | Spooner et al. ......... 173/170 X |

* cited by examiner

*Primary Examiner*—Clark F. Dexter
(74) *Attorney, Agent, or Firm*—Michael D. Bednarek; Shaw Pittman LLP

(57) ABSTRACT

A device in connection with a hand-operated working machine with a water flow directed to the working tool comprises a first control which is a control (15) for a drive motor (3) for the tool, and a second control which is a control (17) for the water supply to the tool. A water control valve (45) in a water supply conduit (14) can be adjusted to adopt chosen opening positions, and is arranged constantly to be kept open in any chosen opening position when the motor is running the tool under influence of the drive motor control. The chosen opening positions are adjustable, i.e. the through opening of the valve can be increased or decreased by using water supply control (17).

6 Claims, 4 Drawing Sheets

DEVICE IN CONNECTION WITH HAND-OPERATED WORKING MACHINE

TECHNICAL FIELD

The invention relates to a device in connection with a hand-operated working machine with water flow directed to the working tool, comprising a first control which is a control for a drive motor for the tool, and a second control which is a control for the water supply to the tool.

BACKGROUND OF THE INVENTION

Hand-operated working machines of the above type are used for many operating purposes mainly in the building industry, especially in connection with reconstruction and enlargement jobs. Cutting, sawing and drilling work are common for cutting openings for doors and windows, for cutting ventilation ducts, foundations and many other things. In the rescue service there is also used machines of this type, for example in order to saw car roofs, house roofs etc. Concrete—even with reinforcing irons—bricks, sheet steel, etc are common to work on. Cooling of the tool by water flow is therefor a standard procedure. U.S. Pat. No. 5,038,474 discloses a device in connection with a cutting machine (circular saw) with an annular saw blade with a double walled disk on the inside of the annular saw blade with outlet openings near the periphery of the disk and with an inlet opening for the cooling water near the drive machinery for the rotation of the blade. U.S. Pat. No. 5,038,474 also shows other main components of the machine, comprising a machine body with a front handle bow and a rear handle. It is also known for this type of machines to arrange, for security reasons, the control for the drive motor, no matter if it is a hydraulic motor, a combustion motor or an electric motor, so that the motor can not be rushed by mistake, if, for example, the operator would stumble or fall. More precisely, there is a latch which in connection with machines driven by a combustion motor would be referred to as a gas latch, but which more generally can be called an accelerator latch, a term which will be used in this text. This accelerator latch first must be pressed by the operator in order to make it possible at all to affect the drive motor control and thereafter remain activated in its functioning position as long as the machine is being operated. As soon as the motor is allowed to run idle, the accelerator latch returns to its original position and must be activated anew before the drive motor control can be affected again.

It is also known to arrange some kind of valve for the water supply, so that the water can be let on and shut off and also be adjusted for different flows. This valve conventionally has been placed in connection with the connection of the water conduit to the machine body. This arrangement makes it impossible, or substantially more difficult, to control the water supply. Either, the water has had to be let on before the cutting work or corresponding is started, which is not convenient, or the work has had to be interrupted in order to start or adjust the water flow, which is not convenient either from a working efficiency or security point of view.

BRIEF DESCRIPTION OF THE INVENTION

The object of the invention is to address the above problem complex. The main distinguishing feature of the invention is that a water control valve in a water supply conduit can be adjusted to adopt chosen opening positions, that the valve is arranged to be constantly kept open in any chosen opening position when the motor runs the tool under influence of the drive motor control, and that the chosen opening positions are adjustable, i.e. that the through opening of the valve can be increased or decreased by means of said control for the water supply. The water control valve is preferably arranged to be forcedly kept open in a chosen opening position when the motor runs the tool. This can be accomplished by means of a third control, which together with said first and second controls is arranged in connection with a rear handle on the machine, preferably so that all three controls can be reached and manoeuvred by the operator by that hand with which he at the same time is holding a rear handle on the machine. The third control is preferably an accelerator latch, see above, for the drive motor, i.e. a means which must have been activated by the machine operator in order that the first control, the drive motor control, shall be possible to be activated. The alternative that the third control has not any other function than to keep the valve open, i.e. is arranged only for that purpose, is however also plausible, but that is generally to be considered a less beneficial alternative than to give the accelerator latch a two-purpose function.

The device of the invention can be designed in many different ways within the scope of the invention. A beneficial model which will be described in greater detail in the following is based on a lever mechanism and is characterised in that the water control valve is arranged to be influenced by a first lever arm -which is an integrated part of or is in its turn possible to affect by said third control. A second lever arm for adjustment of the water control valve is included in the same lever mechanism. More particularly, this can be carried out by the second lever arm being arranged to affect the first lever arm for adjustment of the water control valve in connection with the adjustment of the water supply control. The water supply control in this case may comprise e.g. a cam disc which is rotatable about a shaft in order thereby to be able to affect the second lever arm.

Further characteristics and aspects of the invention appear from a number of dependent claims and from the following description of a preferred embodiment. The embodiment relates to the device according to the invention in use on a cutting machine with annular saw blade. It should however be understood that the principles of the invention can be used also on other machines of the kind mentioned in the preamble, as e.g. cutting discs with traditional centre drive of the cutting blade, cutting machines with chain saw and so on. Different types of drive machinery are also conceivable, such as hydraulic motors, combustion motors and even electrical motors.

BRIEF DESCRIPTION OF THE DRAWINGS

In the following detailed description, reference will be made to the accompanying drawings, of which

DETAILED DESCRIPTION OF THE INVENTION

Figure 1:
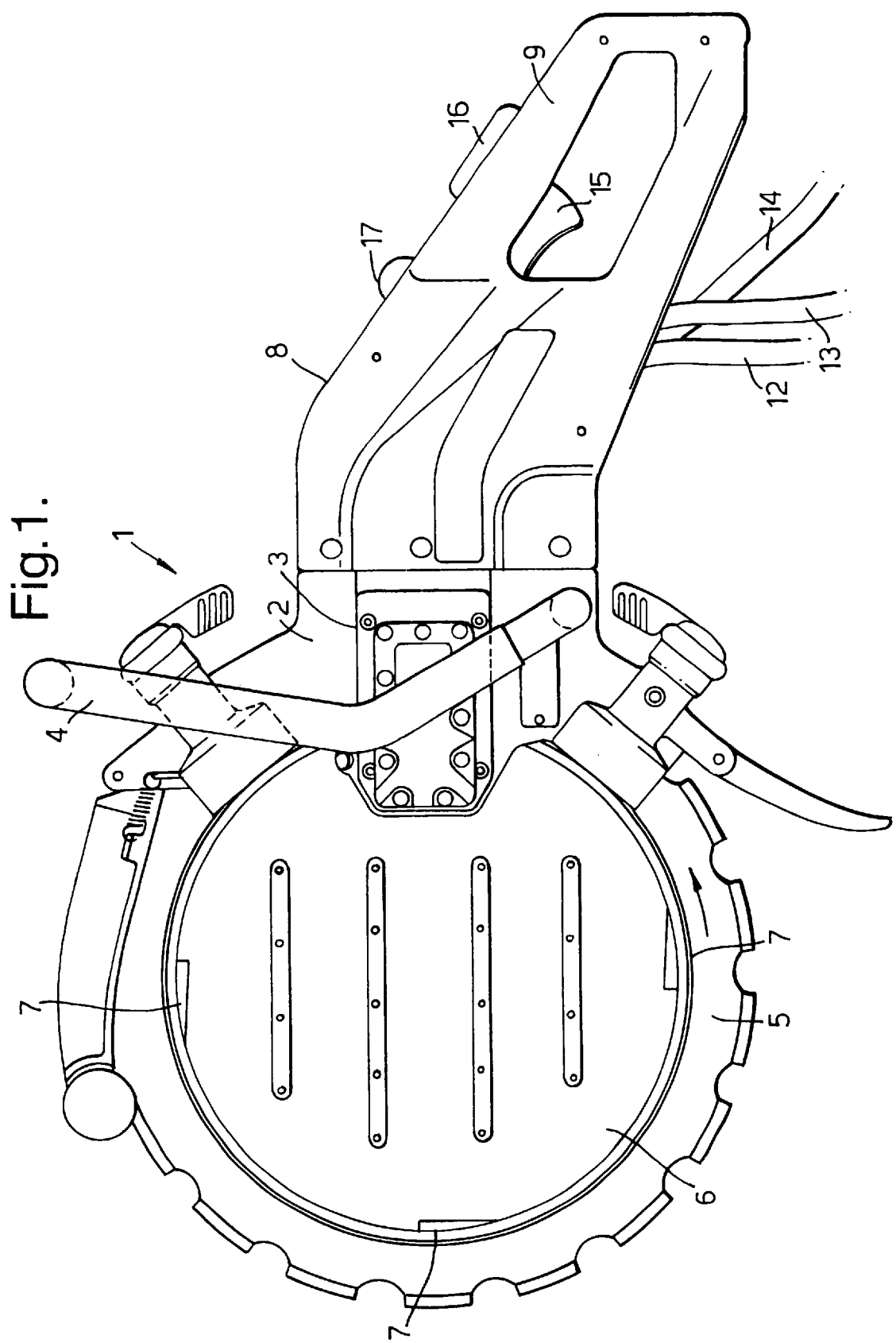
FIG. 1 shows a cutting machine from the left, in which the device according to the invention for controlling the cooling water supply can be employed.

FIG. 1 shows a cutting machine 1 with the following main parts shown in the drawing: a machine chassis 2 with a hydraulic motor 3 and a front handle bow 4, an annular saw blade 5 which is driven by the hydraulic motor 3 via a not shown transmission means, inside the saw blade 5 a disc 6 which acts as a cutting support and distributor of cooling water to the saw blade 5 via a number of nozzles 7 in the periphery of the blade, and a manoeuvring arm 8 with a rear handle 9. A couple of conduits for hydraulic oil for the drive of the hydraulic motor 3 have been denoted 12, 13 and a conduit for cooling water has been denoted 14. The said components are not a part of the invention and will therefor not be described in further detail.

There is, in the region of the rear handle 9, a first control 15 which constitutes a control for the hydraulic motor 3, a second control 17, which constitutes a control, in the following called a water control, for regulation of the cooling water supply to the centre disc 6 and thus via the nozzles 7 to the saw blade 5, and a third control 16 which constitutes an accelerator latch 16 which must be activated before the drive motor control 15 can be affected. Concerning the term accelerator latch, see also the above explanation in connection with the description of the background of the invention.

Figure 2:
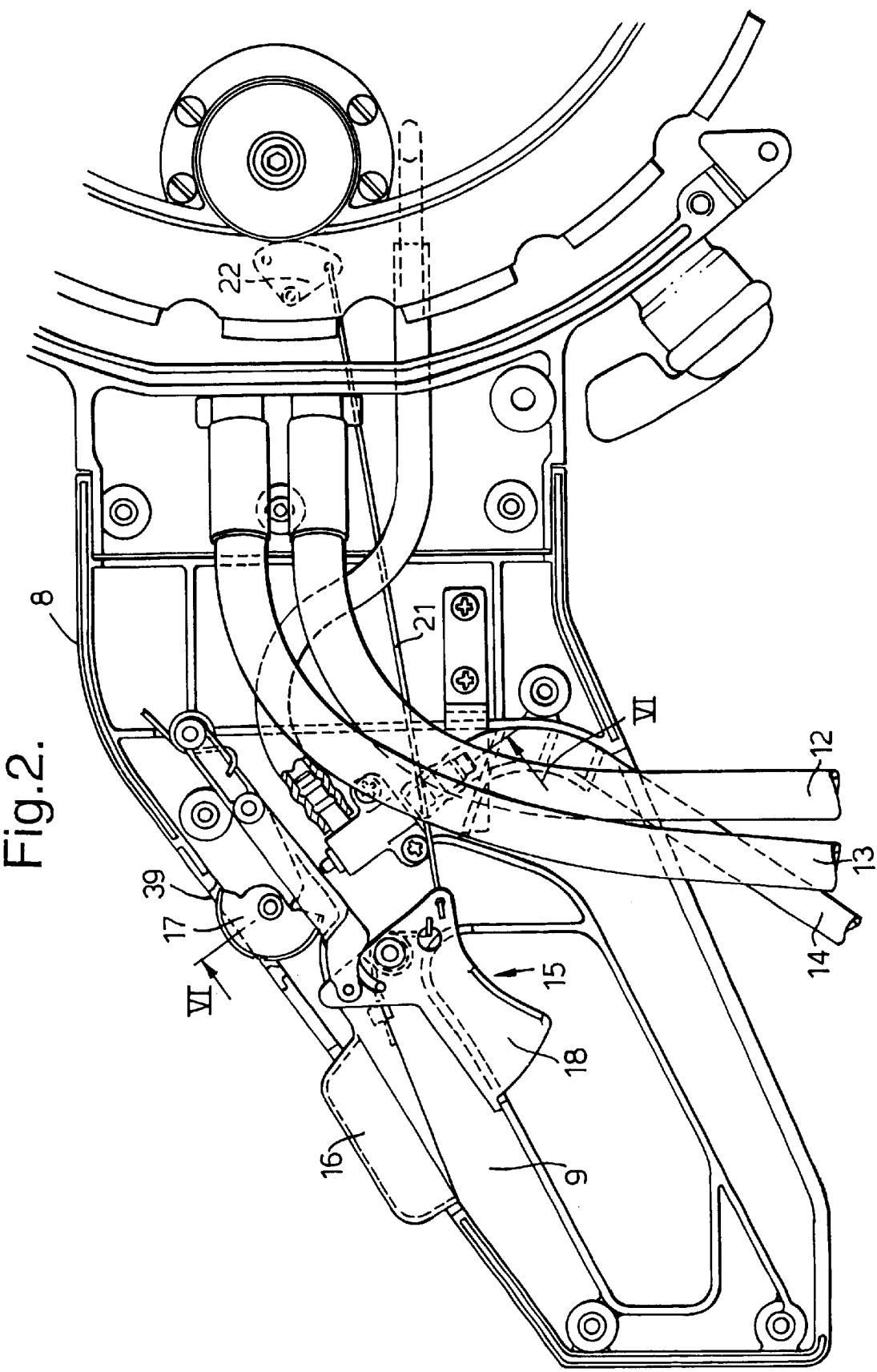
FIG. 2 is a view from the right, showing the inside of a manoeuvring arm, comprising controls for drive motor and water supply.

The motor control 15 comprises a pivot member 23 which is rotatable when the accelerator latch 16 is activated, see below, about a pivot 19, which is fixed in relation to the manoeuvring arm 8, in order to affect a pull rod 21 and a lever arm 22 which in its turn affects a valve in the hydraulic motor 3 and thus the rate of rotation of the hydraulic motor and the saw blade 5. A torsion spring 20 acts as a return spring in order to return the motor control 15 and the accelerator latch 16 to the original positions shown in FIGS. 2 and 3.

The pivot member 23 consists of a part which can be pressed up into the handle 9 and which forms a trigger 18 in the motor control, said part forming an extension on a double armed lever arm, rotatable by means of the trigger 18 about the pivot 19, whereby the pull rod 21 is attached in one of the lever arms, while an angular shaped slot 26 is arranged in the other lever arm. This slot 26 consists of a circular arc portion 24 and a portion 25 which is radial in relation to the centre of the pivot 19.

Figure 3:
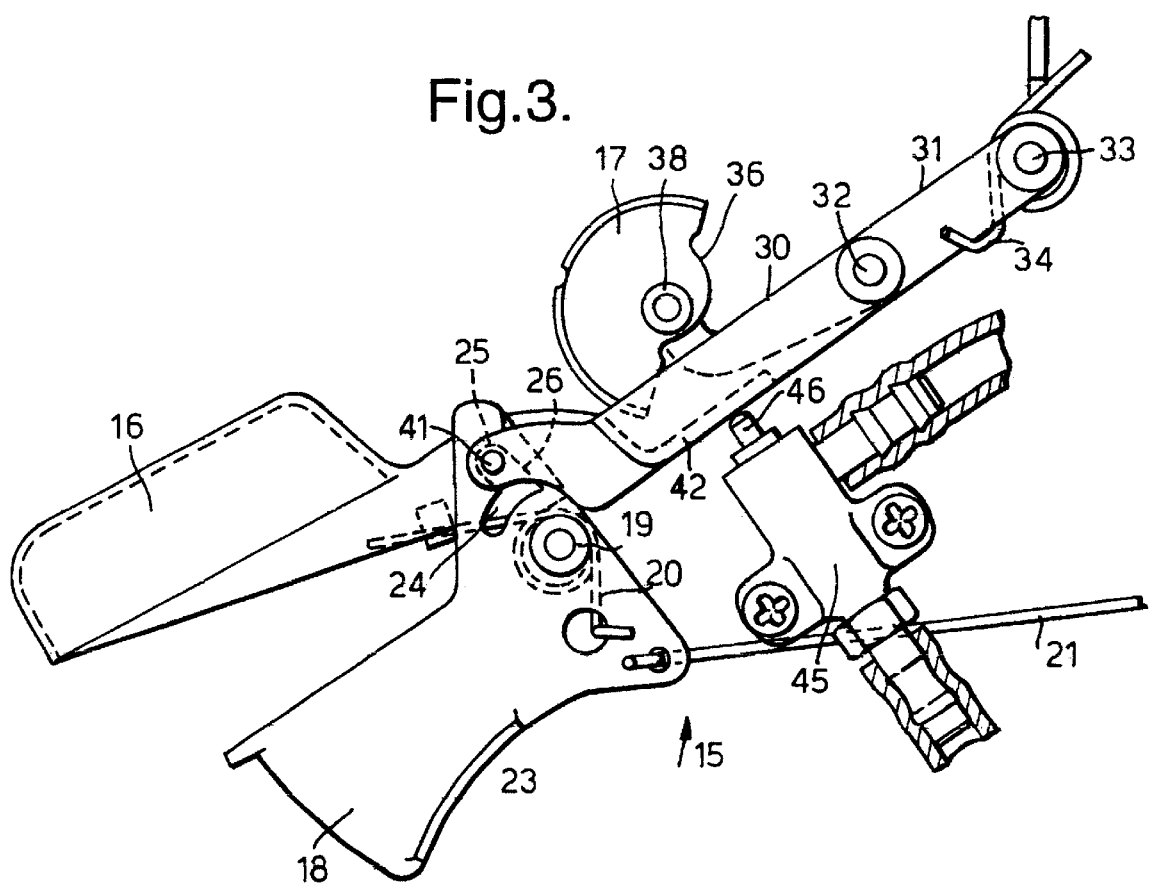
FIG. 3 shows said control with a mechanism included therein, at a greater scale.

The accelerator latch 16, or more correctly, the control for the accelerator latch, consists of a rear, upwards extending portion, which is usually manoeuvred by the thumb, the thumb grip or the palm of the hand of the operator, on a first lever arm 30 which in its front end 32' is rotatably connected with a second lever arm 31, approximately in the mid point 32" of the second lever arm 31, in a first hinge 32, whose axis of rotation is parallel with the axis of rotation of the pivot 19. Further, said first lever arm 30 with the hinge 32 can move in relation to the manoeuvring arm 8 of the cutting machine, i.e. the first lever arm 30 with its front hinge 32 is not journalled in bearings in the manoeuvring arm 8 of the cutting machine. That is to the contrary the case for the second lever arm 31 whose front end 33' presents a rotating hinge 33, which is journalled in bearings in the manoeuvring arm 8. The second lever arm 31 is further affected by a torsion spring 34, which with reference to FIG. 3 is striving to rotate the first lever arm 31 clockwise about the hinge 33.

The second, rear end of the second lever arm 31 is bent upwards and has a flat end surface 35, which is pressed by the torsion spring 34 against an eccentric cam surface 36 on the water control 17. The water control 17 is rotatable about a pivot 38, which has a portion that extends out through an opening 39 on the back of the manoeuvring arm 8 and which is easy to reach for the operator, by e.g. the thumb, when the operator holds the machine in the rear handle 9.

Figure 4:
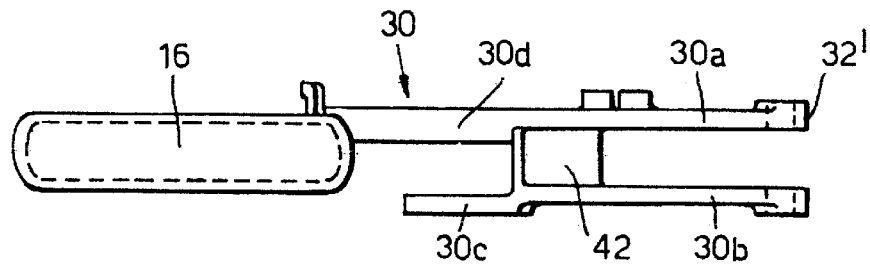
FIG. 4 is an upside view of a first lever arm included in an integrated speed keeper and water control mechanism.
Figure 5:
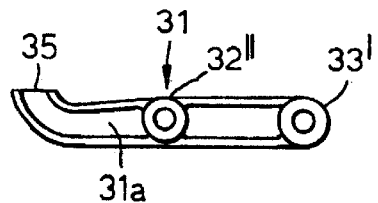
FIG. 5 is a side view of a second lever arm in the same mechanism.

The first lever arm 30 along the greater part of its length is equipped with two parallel shanks 30a and 30b, FIG. 4. The second lever arm 31 with its rear portion 31a extends between said shanks 30a and 30b and past their upper edge with its end portion having said flat surface 35. The left shank 30a continues upwards, backwards and is via a portion 30d connected with the accelerator latch 16. The right shank 30b continues with a portion 30c, parallel with the connection portion 30d of the left shank 30a. A latch rod 41 extends between the portions 30c and 30d through the angular shaped slot 26 which is formed by the slot portions 24 and 25 in the disc 23.

In order for the operator to be able to operate the motor control 15 and to turn it about the pivot 19 for accelerating the drive motor 3, the accelerator latch 16 first must be pressed down by the operator, which he normally does with the palm of the hand or with the thumb grip, at the same time as he grasps the motor control 15 with the fingers of the same hand. When the accelerator latch 16 thus is pressed down, the rod 41 is also led down into the radial portion 25 of the angular shaped slot 26. Not until the rod 41 has reached the corner of the angular shaped slot 26, the control 15 can be rotated, to lead the rod 41 into the circular arc portion 24 of the groove, whereby the drive motor 3 can be started.

Figure 6:
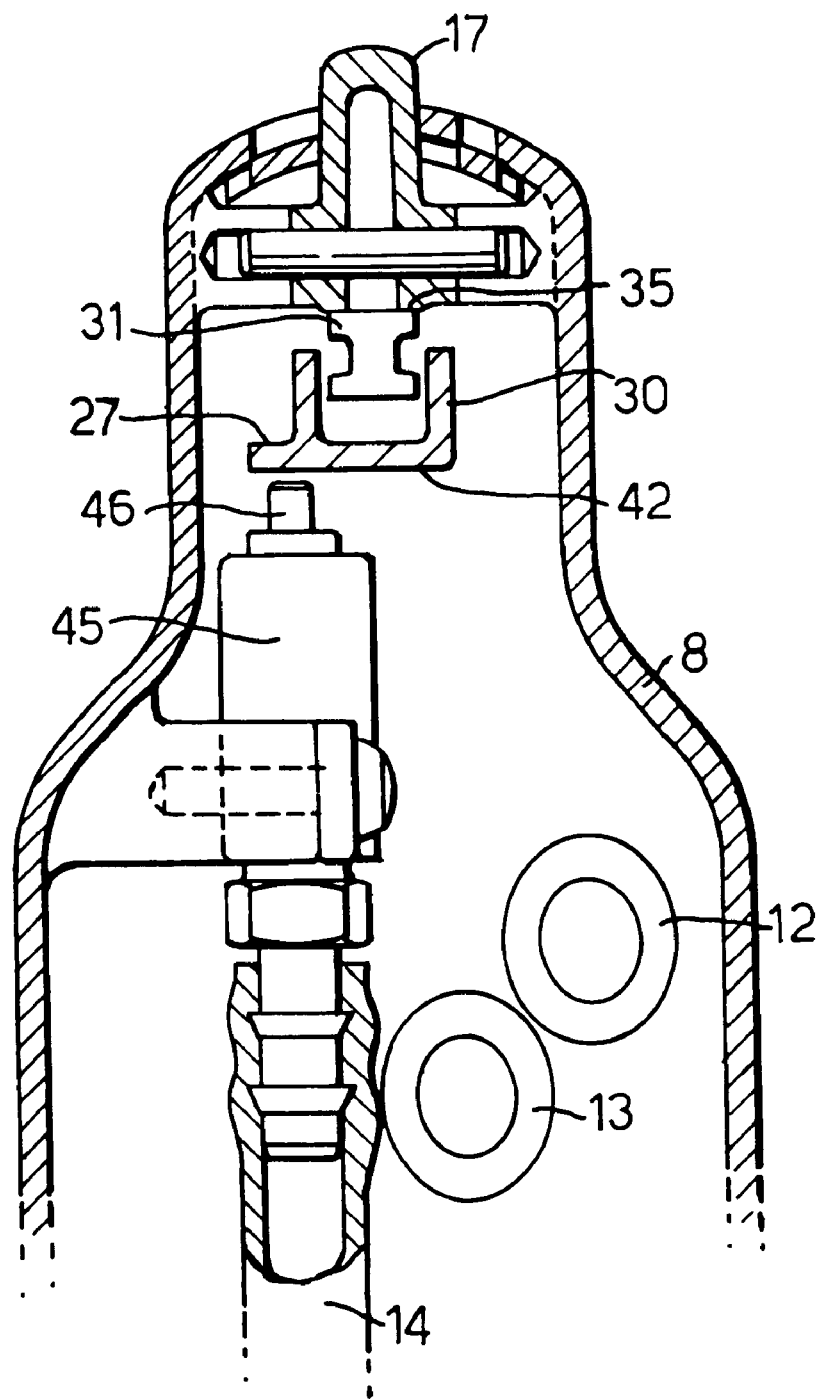
FIG. 6 shows a section VI—VI in FIG. 2.

The two shanks 30a and 30b are connected to each other by a cross connection 42. Further a plate 27 (see FIG. 6) extends from the shank 30a, out to the side. A valve 45 is provided under the plate 27 for regulation of the water flow in the cooling water conduit 14. The valve 45 may be, e.g. a sliding valve, a needle valve or other conventional valve for flow regulation and has a rod 46 contacting the plate 27 and which by action from the plate 27 in order to open the valve to a desired degree,can be pressed into the valve under counter force by a return spring.

The thus described control equipment works in the following way. The original position is supposed to be the position shown in FIG. 2 and FIG. 3. When the operator, with the hand holding the rear handle 9, presses the accelerator latch 16 and the motor control trigger 18 against each other, the rod 41 is first pressed down into the radial slot 25, at the same time as the first lever arm 30 is rotated in the hinge 32 in relation to the second lever arm 31. When the rod 41 has reached the arc portion 24 of the angular shaped slot in the pivot member 23, it can be rotated clockwise about the pivot 19. The rod 21 is hereby pulled backwards and affects the valve in the hydraulic motor 3, to let on the hydraulic oil to drive the hydraulic motor and thus the saw blade 5, at the same time as the rod 41 enters the circular arc slot portion 24. In this way, the accelerator latch 16 has adopted a fixed position, which is kept for as long as the motor control trigger 18 is more or less pressed down. For as long as the rod 41 is in the circular arc portion 24 of the slot 26, the accelerator latch 16 can not return to its original position; not until the motor control 15 has been brought to the idle position.

At the same time as the first lever arm 30 is turned counter clockwise in the hinge 32, the plate 27 presses against the valve rod 46 so that the valve 45 is opened. When the accelerator latch 16 is fixed in its fixed position, when the rod 41 is in the circular arc slot 24, a certain constant flow of cooling water is flowing through the conduit 14 via the control valve 45, which is to a certain degree opened, and further out in the disc 6 and through the nozzles 7. If increased water flow is wanted, the operator rotates the water control 17 forwards, i.e. clockwise about the axis of rotation 38. The eccentric cam surface 36 hereby will glide towards the rear, flat surface 35 of the second lever arm 31 and press it downwards. This results in that the second lever arm 31 is rotated counter clockwise about the axis of rotation 33 under counteraction by the torsion spring 34. This rotating movement also results in that the hinge 32 will move along a small circular arc counter clockwise, i.e. downwards. This, in its turn, causes the first lever arm 30 to rotate clockwise about the rod 41 which hereby also moves slightly in the slot 24. The downwards directed movement of the lever arm 30 in its turn causes the plate 27 to press the rod 46 a bit further into the valve 45, so that the liquid flow will increase. The water supply control 17 in this way can be adjusted to a new chosen position while the cutting machine continuously is in operation, without the operator having to leave hold of the rear handle 9. If the operator wants to reduce the water flow, the water control 17 is turned the opposite direction. When the operator leaves hold of the motor control 15, it rotates back counter clockwise about the pivot 19, so that rod 41 is released from the slot 24. If the operator at the same time does not keep the accelerator latch 16 pressed in, the starter lock will spring upwards by action of the return spring 20, at the same time as the rod 41 enters the slot 25 and the first lever arm 30 rotates clockwise in the hinge 32 and the plate 27 releases the rod 46, so that the water control valve 45 is closed.

From the above description it should be clear that the operator, when the machine is working, holds the rear handle 9 with one hand at the same time as he can adjust the motor accelerator—the motor 3 is normally operating at full speed during work—with the motor control 15, which usually is done with the index finger of the same hand. The accelerator latch 16 at this time is locked in its fixed position, whereby the water control valve 45 is kept open in a chosen opening position. In other words, the operator does not need to actively press down the accelerator latch 16, when that once has been done. This in other words means that no tiresome work need to be done in order to keep the water control valve open, and that no additional steps need to be taken in order to open and to shut the valve, since this is automatically done by the double function of the accelerator latch.

What is claimed is:

1. A hand-operated working machine having a working tool (5), a drive motor (3) operatively connected to the working tool, a rear handle (9) supporting the working tool and being graspable by a hand of an operator, a water supply conduit (14) extending toward the working tool for supplying water to the working tool, and a water control valve (45) connecting together portions of the water supply conduit for controlling flow through said conduit, the machine comprising:

a first control (15) operatively connected to the drive motor for controlling the drive motor, a second control (17) for adjusting the water control valve, and a third control (16) operable to contact and actuate the water control valve, the second control being operable to move the third control with respect to the water control valve, and the first and third controls including means for obstructing movement of the first control whereby the third control is operable as a safety latch, wherein said first control, said second control, and said third control are all arranged in a region proximate the rear handle (9) of the machine, and are all reachable and capable of manipulation by an operator while grasping the rear handle (9) of the machine, and wherein the third control is operatively supported by a movable support structure, and the second control operatively contacts said support structure whereby the second control is capable of transmitting a force to the third control via said support structure to adjust the water control valve.

2. The machine according to claim 1, wherein the third control keeps the water control valve open.

3. The machine according to claim 1, wherein the third control comprises a first lever arm of which at least a portion is operable to manipulate the water control valve (45).

4. The machine according to claim 1, wherein the third control (16) is an accelerator latch for the drive motor, and wherein said means for obstructing movement of the first control is operable such that when the third control is in a first position said means for obstructing precludes the first control from being activated, and when the third control is in a second position said means for obstructing permits the first control to be activated.

5. The machine according to claim 1, wherein said means for obstructing movement of the first control comprises the third control having a rod positioned in a slot defined within the first control, wherein the third control has a final rest position when the rod is in a first portion of the slot that prevents the first control from being operated, and a second activated position when the rod is in a second portion of the slot wherein the third control allows the first control to rotate around a pivot and wherein the third control transmits a force to the water control valve.

6. A hand-operated working machine having a working tool (5), a drive motor (3) operatively connected to the working tool, a rear handle (9) supporting the working tool and being graspable by a hand of an operator, a water supply conduit (14) extending toward the working tool for supplying water to the working tool, and a water control valve (45) connecting together portions of the water supply conduit for controlling flow through said conduit, the machine comprising:

a first control (15) operatively connected to the drive motor via a pull rod that controls the drive motor, the first control comprising a slot having a first and a second portion, a second control (17) including a cam surface for adjusting the water control valve, and a third control (16) having a first and a second position wherein in the first position the third control obstructs movement of the first control by positioning a latch rod in the first portion of the slot, and in the second position permits movement of the first control by positioning the latch rod in the second portion of the slot, whereby the third control functions as a safety latch, wherein the third control is operatively supported by a movable support structure, and the cam surface of the second control operatively contacts said support structure, whereby the second control transmits a force to the third control via said movable support structure when the third control is in the second position to adjust the water control valve.

* * * * *